United States Patent [19]
Mattern et al.

[11] Patent Number: 5,642,389
[45] Date of Patent: Jun. 24, 1997

[54] LIGHT WATER REACTOR IN PARTICULAR A BOILING WATER REACTOR WITH A HIGH DEGREE OF INHERENT SAFETY

[75] Inventors: Jean Mattern, Fischbach/TS; Eberhard Von Staden, Dietzenbach; Werner Brettschuh, Bad Soden am Taunus; Carlos Palavecino, Neu-Isenburg; Werner Hartel, Hamburg, all of Germany

[73] Assignee: Siemens Aktiengesellschaft, Munich, Germany

[21] Appl. No.: 636,897

[22] Filed: Apr. 24, 1996

Related U.S. Application Data

[63] Continuation of Ser. No. 141,283, Oct. 22, 1993, abandoned.

[30] Foreign Application Priority Data

Apr. 22, 1993 [DE] Germany ............... 9306126 U

[51] Int. Cl.⁶ .................................................. G21C 9/012
[52] U.S. Cl. ........................ 376/219; 376/283; 376/299
[58] Field of Search ................................. 376/219, 230, 376/258, 282, 283, 298, 299, 307, 367

[56] References Cited

U.S. PATENT DOCUMENTS

| | | | |
|---|---|---|---|
| 4,072,560 | 2/1978 | Seidelberger | 376/282 |
| 4,363,780 | 12/1982 | Hannerz | 376/283 |
| 4,605,530 | 8/1986 | Tatemichi | 376/237 |
| 4,686,077 | 8/1987 | Straub | 376/230 |
| 4,879,087 | 11/1989 | Akiyama et al. | 376/216 |
| 4,948,554 | 8/1990 | Gou et al. | 376/283 |
| 4,986,956 | 1/1991 | Garabedian | 376/283 |
| 5,008,069 | 4/1991 | Fredell | 376/299 |
| 5,076,999 | 12/1991 | Forsberg | 376/299 |
| 5,082,619 | 1/1992 | Sawyer | 376/283 |
| 5,145,639 | 9/1992 | Hui | 376/283 |
| 5,158,742 | 10/1992 | Dillmann | 376/299 |

FOREIGN PATENT DOCUMENTS

| | | |
|---|---|---|
| 0030698 | 6/1981 | European Pat. Off. . |
| 3517354 | 11/1986 | Germany . |
| 3316037 | 8/1988 | Germany . |
| 3803311 | 8/1988 | Germany . |

*Primary Examiner*—Daniel D. Wasil
*Attorney, Agent, or Firm*—Herbert L. Lerner; Laurence A. Greenberg

[57] ABSTRACT

A light water reactor, in particular a boiling water reactor, includes a reactor pressure vessel having an interior, a core disposed in a lower half of the pressure vessel, fuel assemblies disposed in the core, and a column of water covering the core and acting as a coolant and a moderator. The column has an initial level range during normal operation. A passively operating safety device is provided. Fluid lines are connected between the safety device and the interior of the pressure vessel. The fluid lines automatically transmit an actuation criterion to the safety device, with at least a drop of a level in the pressure vessel to a value below the initial level range serving as the actuation criterion.

11 Claims, 3 Drawing Sheets

LIGHT WATER REACTOR IN PARTICULAR A BOILING WATER REACTOR WITH A HIGH DEGREE OF INHERENT SAFETY

This application is a continuation of application Ser. No. 08/141,283, filed Oct. 22, 1993, now abandoned.

BACKGROUND OF THE INVENTION

1. Field of the Invention

The invention relates to a light water reactor with a reactor pressure vessel, a core being composed of fuel elements and being disposed in the lower half of the reactor pressure vessel, and a column of water covering the core and being used as a coolant and a moderator, the column having an initial level range during normal operation.

2. Summary of the Invention

It is accordingly an object of the invention to provide a light water reactor, in particular a boiling water reactor with a high degree of inherent safety, which overcomes the disadvantages of the heretofore-known devices of this general type and which increases the degree of inherent safety of such a boiling water reactor by the use of passively operating safety devices.

With the foregoing and other objects in view there is provided, in accordance with the invention, a light water reactor, comprising a reactor pressure vessel having an interior, a core disposed in a lower half of the pressure vessel, fuel assemblies disposed in the core, and a column of water covering the core and acting as a coolant and a moderator, the column having an initial level range during normal operation; a passively operating safety device; and fluid lines connected between the safety device and the interior of the pressure vessel, the fluid lines having means for automatically transmitting an actuation criterion to the safety device, with at least a drop of a level in the pressure vessel to a value below the initial level range serving as the actuation criterion.

In accordance with another feature of the invention, the pressure vessel has a steam space; the safety device is a switching vessel in the form of a pressure vessel with a fluid space and a gas cushion space, the switching vessel has heat exchanging pipes being submerged in the fluid space and having one end communicating with the steam space and another end communicating with the reactor water column during normal operation or when the initial level range is present; the switching vessel initiates condensation in the heat-exchanging pipes if a flow of steam occurs from the reactor interior into the heat exchanging pipes, when dropping below the initial level region of the reactor water; and including at least one of pilot and main fittings, an increase in pressure due to absorbed condensation heat in the switching vessel being used as a derived actuation criterion for passive actuation of the at least one of pilot and main fittings.

In accordance with a further feature of the invention, there are provided control rods to be inserted into the core, the at least one of pilot and main fittings actuated when the derived actuation criterion has been fulfilled, include live steam penetration fittings, the at least one of pilot and main fittings actuate a closing of the live steam penetration fittings as a safety measure and/or actuate a reactor scram as a safety measure by quickly inserting the control rods in the core.

In accordance with an added feature of the invention, there is provided a condensation chamber, and blow-off units connected to the at least one of pilot and main fittings being actuated when the derived actuation criterion has been fulfilled, the blow-off units blowing-off steam in the condensation chamber to depressurize the pressure vessel or a primary loop.

In accordance with an additional feature of the invention, there is provided a containment in which the pressure vessel is disposed; the safety device being an open flooding reservoir disposed outside the pressure vessel in the containment and having a flooding water column with a water level being geodetically higher than the reactor water column; at least one connecting line serving as a fluid line connected between the interior of the pressure vessel and the flooding water column, the at least one connecting line having a non-return fitting being held in a closed position by a reactor-side overpressure in normal operation of the reactor pressure vessel and in the initial level range of the reactor water, and the non-return fitting being opened due to pressure equalization and flooding water being added to the pressure vessel through the connecting line when reaching or dropping below another level range of the reactor water column after pressure in the pressure vessel is reduced to a value approaching that of pressure in the containment.

In accordance with yet another feature of the invention, there is provided a condensation chamber below the flooding reservoir for blowing-off excess reactor steam.

In accordance with yet a further feature of the invention, the at least one connecting line has a first line section connected to the pressure vessel, a second line section connected to the flooding reservoir and an interior, the non-return fitting is connected between the first and second line sections, and the first line section slopes down toward the non-return fitting for largely preventing a transfer of heat by convection from the reactor water to an interior of the connecting line.

In accordance with yet an added feature of the invention, the reactor core has an upper edge, and the connecting line has a lower end connected to the pressure vessel at a point above the upper edge of the reactor core.

In accordance with yet an additional feature of the invention, there is provided a water reservoir containing water; the pressure vessel having a steam space; the safety device being an emergency condenser having heat exchanging pipes being disposed in the water of the water reservoir; an inlet pipe configuration interconnecting the emergency condenser and the steam space during normal operation of the reactor, and a drainage pipe configuration interconnecting the emergency condenser and a lower region of the reactor water column at a point above the reactor core; water or condensate in the heat exchanging pipes stagnates during normal operation, but reactor steam flows through the inlet pipe configuration into the heat exchanging pipes and condenses there if the level of the reactor water drops to another level below the initial level range, so that condensate flows back into the pressure vessel through the drainage pipe configuration.

In accordance with again another feature of the invention, in this embodiment as well there is provided a condensation chamber below the water reservoir for blowing-off excess reactor steam.

In accordance with again a further feature of the invention, the inlet pipe configuration has an inlet and a connection to the heat exchanging pipes and slopes downward from the inlet to the connection, and the drainage pipe configuration has a connection to the heat exchanging pipes and an outlet end and slopes downward from the connection to the outlet end.

In accordance with again an added feature of the invention, the heat exchanging pipes have first and second pipe legs and a reversing bend and are essentially hairpin shaped with respective upward and downward slopes, the first pipe leg being connected to the inlet pipe configuration and the second pipe leg being connected to the drainage pipe configuration.

In accordance with a concomitant feature of the invention, the drainage pipe configuration has a downwardly running, hairpin shaped pipe bend located on a section in a gap between the pressure vessel and the flooding reservoir, the bend forming a circulation block during normal operation.

The advantages which can be realized with the invention lie primarily in the fact that the new light water reactor is particularly well suited for the new generation of boiling water reactors having a specific power density which is preferably reduced as compared to today's power reactors, and in which a greater passive cooling water supply is made available within the plant. The new light water reactor is preferably suited for a power or output range of up to approximately 1000 MWe, whereby essential components can be taken from the base of experience with today's power reactors having approximately twice the output. In particular, the following advantages can be realized by means of the invention:

- at least one safety-relevant redundancy should be passively operated (disconnect, pressure release, isolation, after-cooling, level maintenance),
- the holding time in which active measures (replacement measures) must be taken, can be extended to approximately seven days,
- active measures can then either be in the form of the start-up of existing systems or of the simple addition to the water reservoir, such as by means of fire department connections,
- to temper the effects of extremely unlikely core meltdowns, at least one fall back position (such as in-vessel control of the core melt, or ex-vessel cooling of an escaped core melt) is available.

Other features which are considered as characteristic for the invention are set forth in the appended claims.

Although the invention is illustrated and described herein as embodied in a light water reactor, in particular a boiling water reactor with a high degree of inherent safety, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a boiling water reactor system, which is represented in somewhat greater detail, whereby the safety devices according to FIGS. 3 and 4 are recognizable in this illustration which more closely reflects practice.

DESCRIPTION OF THE PREFERRED EMBODIMENTS

Figure 1:
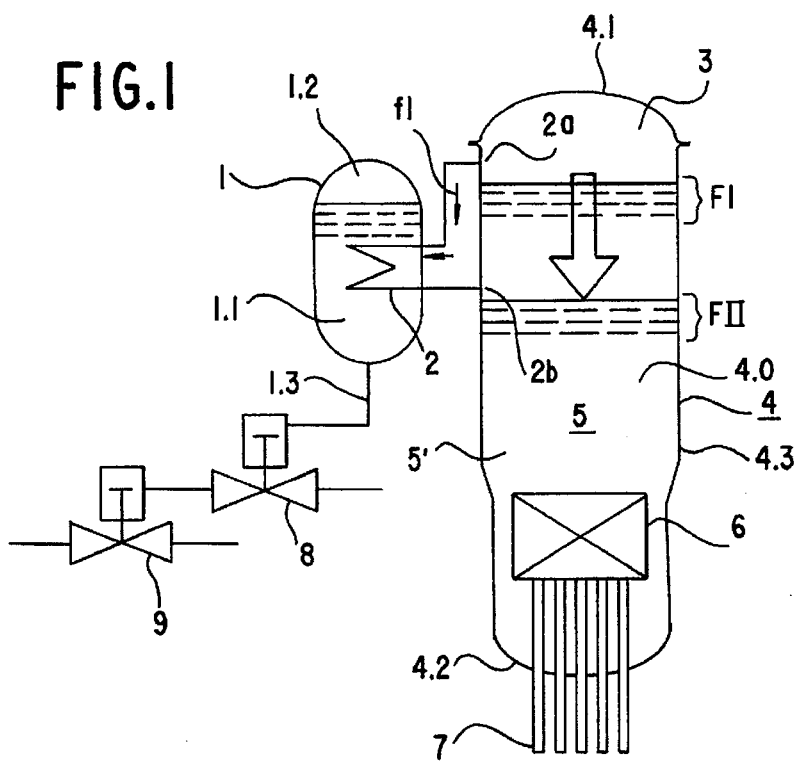
FIG. 1 is a simplified, diagrammatic and schematic representation of a boiling water reactor with an initially passively operating safety device, which is realized as a switching vessel in the form of a small pressure vessel with a fluid space and a gas cushion space.
Figure 2:
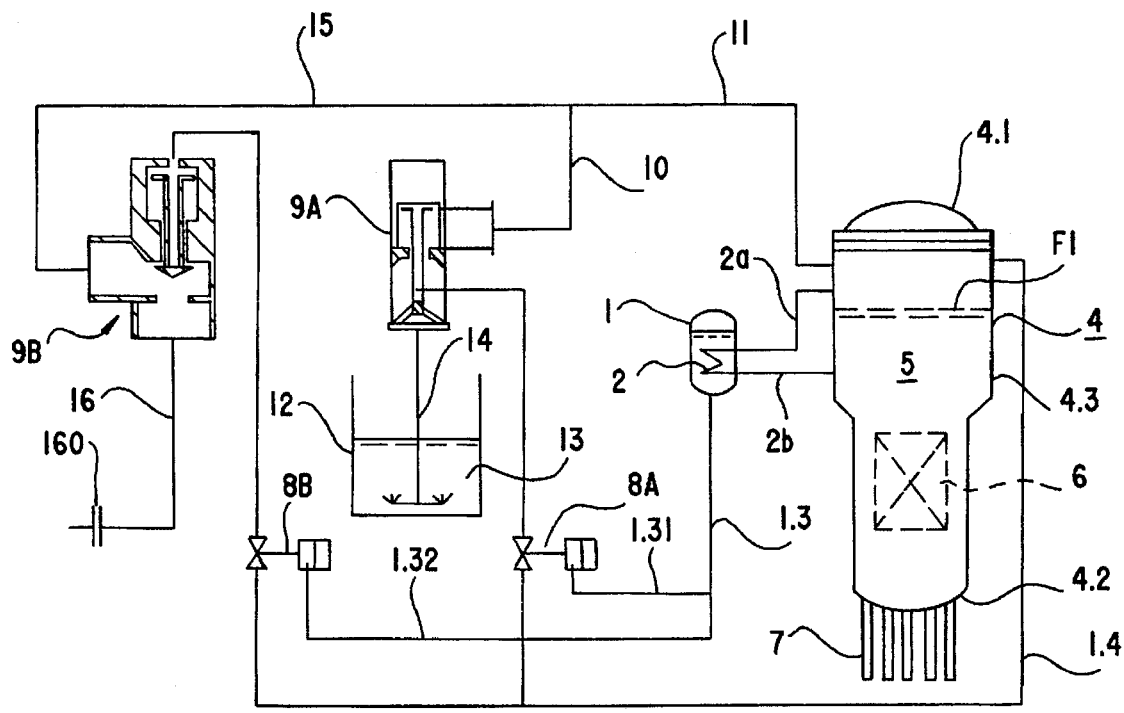
FIG. 2 shows the device of FIG. 1 with pilot and main fittings.

Referring now to the figures of the drawing in detail and first, particularly, to FIGS. 1 and 2 thereof, there is seen a passively operating safety device including a switching vessel or container 1 in the form of a pressure vessel with a fluid space 1.1 and a gas cushion space 1.2 located above it. Submerged in the fluid space 1.1 are heat exchanging pipes 2 having one end 2a which communicates with a steam or vapor space 3 of a reactor pressure vessel 4 and, under normal operating conditions or when an initial level range FI is present, another end 2b of these tubes communicates with a reactor water column 5. The reactor pressure vessel 4 is essentially a hollow cylindrical pressure vessel in a vertical configuration which has a pressure-tight, domed cover 4.1 flanged onto it, a likewise domed bottom calotte or cup 4.2, and a shell or jacket 4.3. A reactor core 6, including individual non-illustrated fuel assemblies, is located in the lower half of the interior of the reactor and control rods 7 with their non-illustrated absorber blades can be inserted into the gaps between the fuel assemblies. In this way, reactor power can be decreased by means of deeper insertion of the absorber blades into the core and reactor power can be increased by means of shallower insertion or removal of the absorber blades. Heat generated by controlled fission in the core is transferred to reactor water 5'. With medium-output boiling water reactors (i.e. in the order of magnitude of up to approximately 1000 MWe), this water circulates naturally, i.e. without special circulation pumps. The generated live steam is passed through live steam lines, which are not shown in FIG. 1, to non-illustrated steam turbines. The switching vessel 1 is thus equipped to initiate condensation in its heat-exchanging pipes 2 if there is a flow of steam in the direction of arrows f1 from the reactor interior into the heat exchanging pipes 2 through their one end 2a, when dropping below the initial level range FI of the reactor water 5'. The in-flowing wet steam is cooled because the heat exchanging tubes 2 are themselves cooled by the fluid bath or space 1.1. Therefore the steam condenses and flows back into the fluid column 5 or the reactor water 5' through the other ends 2b of the heat exchanging pipes which empty into the interior of the reactor. Due to the condensation process, the water bath 1.1 absorbs the condensation heat and a resultant increase of pressure in the switching vessel 1 is a derived actuation criterion for passive actuation of pilot fittings 8 and/or main fitting 9 by reporting the increased control pressure in the switching vessel 1 through a pressure control line 1.3 to the pilot fitting 8. A non-illustrated direct actuation of the main fitting 9 would also be possible. Such a main fitting 9 can, for example, be used to blow off steam in a condensation chamber to purposefully depressurize the reactor pressure vessel and/or a primary loop. Other possibilities are to use the pilot fittings and/or main fittings to actuate a reactor scram, i.e. insertion or fast insertion of the control rods into the core, or to close penetration fittings of the live steam lines, one of which (a fitting 9B) is shown in FIG. 2. This will be discussed below in greater detail. The fluid lines for transmission of the actuation criterion are therefore the heat exchanging pipes 2 (seen in FIG. 1) including their feed 2a and drain 2b (seen in FIG. 2).

Figure 4:
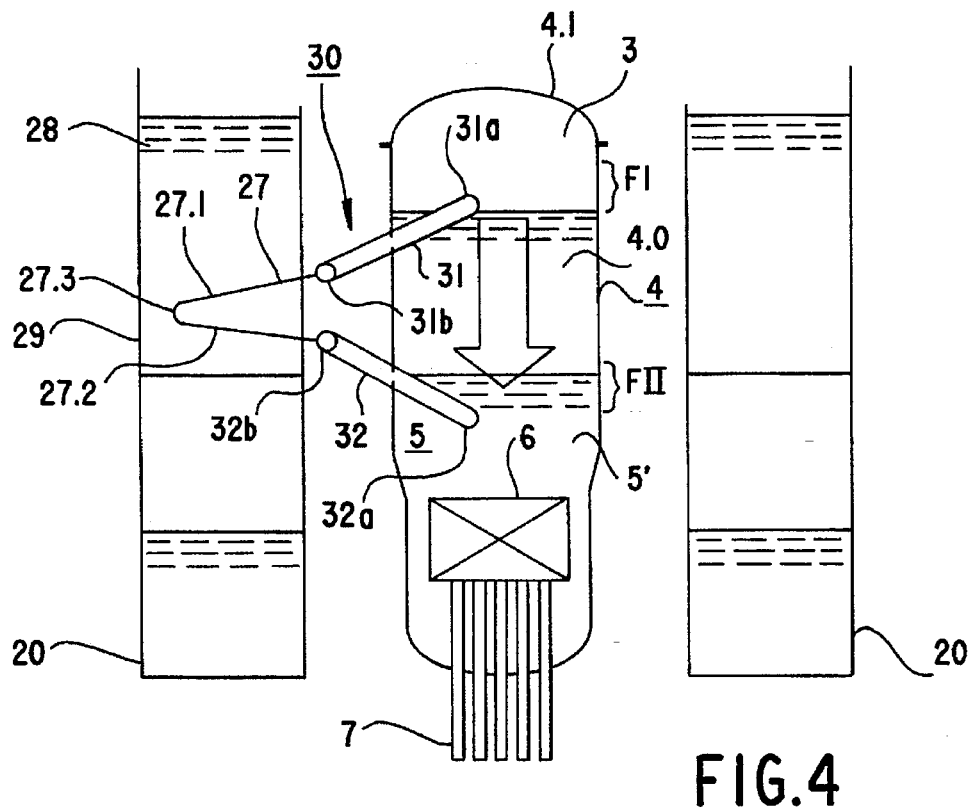
FIG. 4 is a simplified illustration corresponding to FIGS. 1–3 of a boiling water reactor having an emergency condenser as a third embodiment of a passively operating safety device, with the condenser having heat exchanging elements being in principle hairpin-shaped pipes located in a water reservoir or pool, whereby the heat exchanging pipes are connected to the interior of the reactor by means of a configuration of inlet or drainage pipes.
Figure 5:
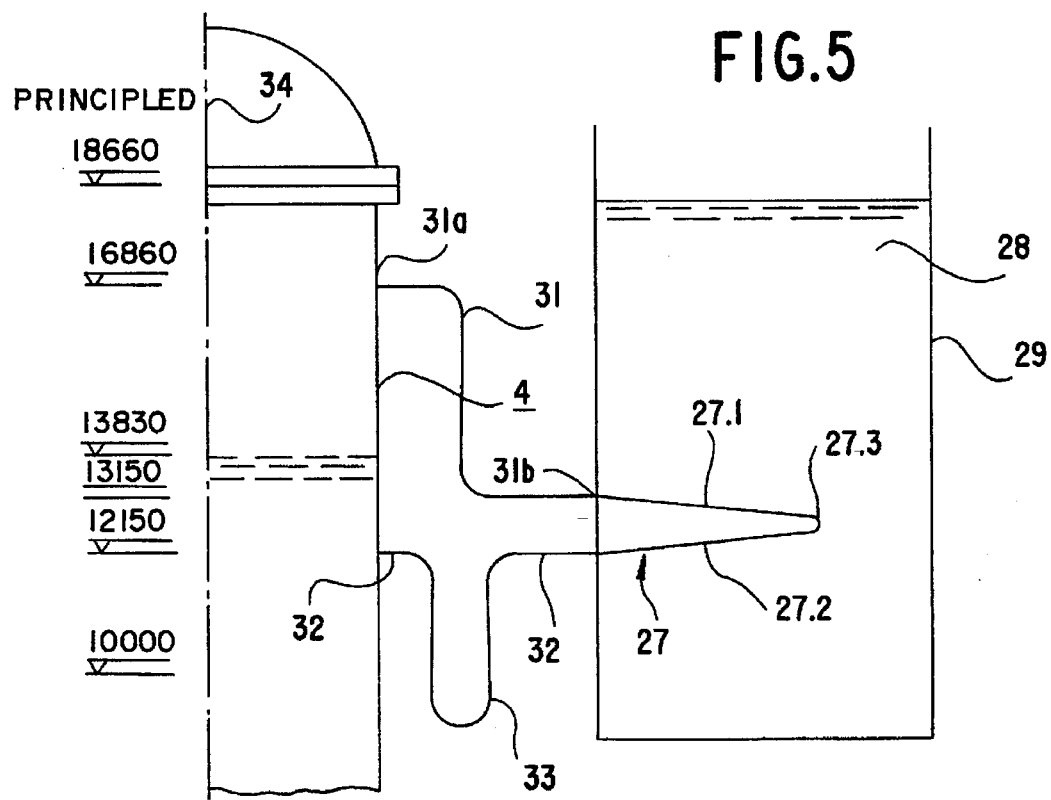
FIG. 5 is an enlarged view of a variation of the embodiment of FIG. 4, whereby the drainage pipe configuration has a siphon constructed as a hairpin-shaped pipe bend being bent downward and acting as a circulation trap.

FIG. 2 shows a normally closed first main fitting 9A, through which primary medium or reactor steam arriving through lines 10, 11 can be blown-off in a condensation chamber 12 with a water bath 13 through a nozzle pipe 14. Actuation of the main fitting 9A is carried out by means of a pilot fitting 8A, which itself can be actuated from the switching vessel 1 through a pressure control line 1.3, 1.31. A second main fitting 9B is shown in an open position. Sections of pipe 15 and 11 attached to the main fitting 9B belong to a live steam line 16, so that live steam can be directed to a non-illustrated steam turbine through the live steam line 16 originating from the main fitting 9B. On the other side of a wall entrance or bushing 160 passing through a non-illustrated wall of a containment C (seen in FIG. 6), there is an additional penetration fitting in series with the main fitting 9B, which penetration fitting is actuated in the same manner as the fitting 9B. In the case of the malfunction discussed herein, i.e. if the level drops out of the initial or normal level range FI to a lower level range FII due to a transient or the like, a pilot fitting 8B is actuated by the switching vessel 1 through pressure control lines 1.3, 1.32, and the pilot fitting then brings the main fitting 9B into its closed position. As shown, the live steam pressure in the reactor pressure vessel 4 can serve as the control pressure in pressure control line 1.4. As can be recognized, the illustrated control is provided by means of passively operating safety devices without requiring any fittings to be actively actuated. Thus, a significant increase of the inherent safety can be achieved. It is possible to advantageously position the illustrated switching vessels 1 with their heat exchanging pipes 2 of FIGS. 1 and 2 on a level line, for example, that is "barely" below the normal or initial level range FI of the reactor pressure vessel 4 in a non-illustrated manner, so that the increased control pressure in the switching vessel 1 is available at a value above the level range FII for a relatively short time (in comparison to the illustrated position of the switching vessel 1) following a reduction in level from the level range FI. This is of particular advantage for the actuation of a reactor scram and for closing the penetration fittings. However, the automatic depressurization of the reactor pressure vessel 4 by means of the blow-off, discharge or drain off unit 9A, 12, 13, 14 should only be actuated at a lower level, such as the level range FII or preferably even lower, such as is permitted with the illustrated switching vessels 1 (or separate non-illustrated switching vessels which are located even lower). The actuating level FII is normally not reached if there is an emergency condenser 30 such as is shown in FIGS. 4 and 5 (but not in FIGS. 1 and 2) and if there is no other loss of coolant.

In the previous embodiment of a safety device, as mentioned, the fluid lines for the automatic reporting of an actuation criterion (level below the initial or normal level FI) were provided as pipes 2 or as inlet pipes and drainage pipes with reference to the heat exchanging pipes 2, whereby in the case of the lower level FII, there is a derived actuation criterion in the form of an increased control pressure.

Figure 3:
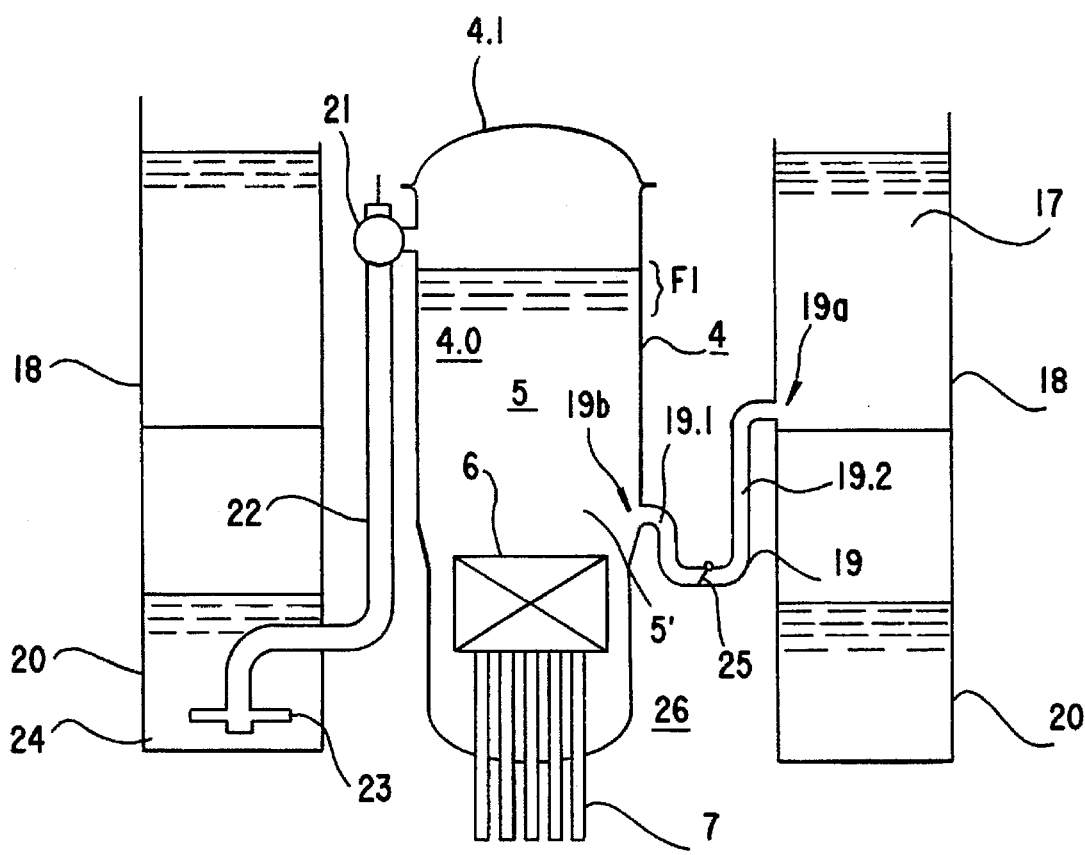
FIG. 3 is a diagrammatic and schematic representation of a second embodiment of a passively operating safety device, which is formed of an open flooding reservoir or tank, having a water level which is geodetically higher than the reactor water column and which is connected with the interior of the reactor through a connecting line.

With the second embodiment of a safety device according to the invention as disclosed in FIG. 3, the passively operating safety device is realized as an open flooding reservoir or well 18 having water 17 with a level which is geodetically higher than the reactor water column 5 and is located outside of the reactor pressure vessel 4. An interior 4.0 of the reactor pressure vessel 4 communicates with the flooding water column 17 in the flooding reservoir 18 through at least one connecting line 19 which acts as a fluid line, so that under normal operation of the reactor and within the indicated initial range of the level FI of the reactor water 5', a non-return or check fitting 25 is held in its closed position by means of a reactor-side overpressure (approximately 70 bar+ hydrostatic pressure due to the level FI). It is only when the level reaches or drops below the second level range (see FIG. 1) of the reactor water column, which lies below the initial level range FI, after pressure in the pressure vessel drops to a value which approaches the containment pressure (such as by means of the blow-off unit 9A, 12, 13, 14 as shown in FIG. 2), that the non-return fitting 25 can open due to the pressure equalization and flooding water can be added to the reactor pressure vessel 4 through the connecting line 19. It is preferable that the flooding reservoir 18 be located above a condensation chamber 20, which is used for blowing off excess reactor steam. For example, this chamber can be a toroidal or ring chamber, whereby in the left part of the condensation chamber 20 there is seen a condensation pipe 22 which branches off from a live steam line through a blow-off valve 21. This pipe has a nozzle head 23 on its lower end which is submerged in a water bath 24 of the condensation chamber 20. The flooding reservoir 18, which is open toward the top, can also be ring-shaped, corresponding to the condensation chamber 20, so that in this manner a very large water reservoir is available.

As mentioned above, the opening of the connecting line 19 can be closed by the non-return fitting 25, which opens if the above-described pressure equalization occurs. The non-return fitting can be constructed as a valve or a flap. The connecting line 19 is curved in such a manner that its upper end 19a is connected to the lower region of the flooding reservoir 18, and its lower end 19b is connected to the reactor pressure vessel 4 at a point above the upper edge of the reactor core 6, as shown. The reactor core thus always remains covered by the reactor water 5' or by the water 17 from the flooding reservoir. It is important that a section 19.1 of the connecting line 19 between the pressure vessel 4 and the non-return fitting 25 be sloped downward (as a heat trap), as shown. In this manner, a transfer of heat by convection from the reactor water 5' to the interior of the line section 19.1 is prevented. A line section 19.2 between the non-return fitting 25 and the flooding reservoir 18, and the line section 19.1, are approximately S-shaped. In the very unlikely event that the connecting line 19 should crack, the contents of the flooding reservoir 18 would flow through non-illustrated redundant lines into the reactor pressure vessel 4, and the remaining portion would flow through the crack into a reactor pit 26. The water supply in the flooding reservoir 18 is large enough to ensure that even in this case, the level of water in the reactor pit in the event of the abnormal occurrence mentioned above is still higher than the upper edge of the core 6, so that the core 6 always remains covered in this manner, as well.

The passively operating safety device as shown in FIGS. 4 and 5 includes the emergency condenser 30 having heat exchanging pipes 27 in water 28 of a water reservoir 29. In normal operation of the reactor 4 the condenser 30 communicates with the steam space 3 through an inlet pipe configuration 31, and with a lower region of the reactor water column 5 at a point above the reactor core 6 through a drainage pipe configuration 32. The location of the emergency condenser 30 is chosen in such a way that its heat exchanging pipes 27 are filled with condensate during normal operation of the reactor, i.e. they are in communication with the water column 5. In this manner, the water found in the pipe system 27, 31, 32 of the emergency condenser 30 stagnates during normal operation. If, however, the level of the reactor water 5' drops to the second level FII below the initial level FI, reactor steam flows through the inlet pipe configuration 31 into the heat exchanging pipes 27 of the emergency condenser 30 and condenses there because the pipes 27 are cooled by the water bath 28. The condensate flows through the drainage pipe configuration 32 back into the reactor pressure vessel 4. This means that a transfer of heat from the steam to the water bath 28 through the heat exchanging pipes 27 begins automatically. The output of the emergency condenser 30 increases up to a maximum value as the level in the pressure vessel 4 falls. The fluid lines according to the invention are therefore the lines 31, 27 and 32.

It is preferable for the water reservoir 29 to be located above the condensation chamber 20 for blowing off excess reactor steam and for this reservoir, like the condensation chamber, to also be ring shaped.

As is explained below in greater detail with reference to FIG. 6, it is preferred that the water reservoir 29 be constructed as a flooding reservoir 18 (seen in FIG. 3).

FIG. 4 shows that the inlet pipe configuration 31 slopes downward from an inlet 31a thereof to a connection 31b with the heat exchanging pipes 27 of the emergency condenser. Similarly, the drainage pipe configuration 32 slopes downward from a connection 32b with the heat exchanging pipes 27 to an outlet 32a thereof. The drainage pipe configuration 32, which can be referred to as a condensate return line, preferably ends in a non-illustrated flow limiter, which offers the least possible resistance in the specified flow direction but, in the (very unlikely) event of a rupture of the return line 32, effectively prevents outflow from the pressure vessel. In coordination with this layout of the inlet and drainage pipe configurations, the heat exchanging pipes 27 of the emergency condenser 30 are formed of first and second legs 27.1, 27.2 and a reversing bend 27.3 and are essentially hairpin shaped with an upward or downward slope, wherein the first leg 27.1 is connected to the inlet pipe configuration 31 and the second leg 27.2 is connected to the drainage pipe configuration 32.

FIG. 5 shows that there is a downward sloping, hairpin-shaped pipe bend 33 located on a section of the drainage pipe configuration 32 in the space between the reactor pressure vessel 4 and the water or flooding reservoir 29. The pipe bend 33 forms a circulation block or siphon during normal operation. Since this depends on the height relationship, the height relationships are drawn in as a scale next to a dot-dash reactor axis line 34. The circulation block 33 with its hairpin-shaped bends is larger than shown. These bends extend, for instance, over a height difference of 0.5 to 1 m. The circulation block is also to be advantageously provided in the example according to FIG. 4 or according to FIGS. 1 and 2 and is actually in the respective drain or return side branch 32 or the drain 2b in a non-illustrated manner.

FIG. 6 shows a section of a concrete structure of a reactor building which is designated with reference symbol RG and has vertical and horizontal concrete walls and ceilings 35, 36, wherein the reactor pressure vessel 4 is mounted by means of support brackets 37 to a bearing structure 36a and is located in a safety vessel C (containment). Reference numeral 26 again represents the reactor pit. The flooding reservoir 18 which was explained with reference to FIG. 3 can also be seen above the condensation chamber 20 in FIG. 6. Additionally shown is the emergency condenser 30 which, with its hairpin shaped heat exchanging pipes 27, is submerged in the water column 17 of the open flooding reservoir 18. The curved connecting line 19 leads from the flooding reservoir 18 into the reactor pressure vessel 4. A chamber 38 above the reactor pressure vessel 4 is constructed as an additional water reservoir. An opening 39 in a ceiling slab 36b (which is used for removing the cover 4.1, for removing a steam dryer and water separator 390 and for exchanging fuel assemblies, etc.) is sealed by a calotte or cup-shaped cover 40. A containment condenser 41 for the condensation of steam in the containment C is connected to the water reservoir 38 by means of an inlet line 42a and a return line 42b, wherein these lines 42a, 42b are passed with a tight seal through the ceiling 36b. The steam condensed by the containment condenser 41 drips into the flooding reservoir 18 located below this condenser 41. During operation of this condenser 41, a natural circulation is established from the reservoir 38, through the pipes 42a, through heat exchanging pipes of the condenser 41 and back through the pipes 42b into the reservoir. Through the use of this apparatus, forced condensation of steam in the containment can be achieved, thus effectively limiting the containment pressure and also removing the afterheat from the containment.

FIG. 6 also shows a fragmentary illustration of the condensation pipe 22, which is submerged with its nozzle head 23 in the water bath of the condensation chamber 20. The switching vessel 1 is not shown in FIG. 6. However, its use is advantageous as explained above. A particular advantage of the emergency condenser 30 (see FIGS. 4 and 5) is that just like the switching vessel 1 according to FIGS. 1 and 2, it is not sealed, it is ready for use and it is merely activated by a drop in the level FI in the pressure vessel 4, thus ensuring completely passive safety.

We claim:

1. A light water reactor, comprising:

a reactor pressure vessel having an interior, a core disposed in a lower half of said pressure vessel, fuel assemblies disposed in said core, a column of water covering said core and acting as a coolant and a moderator, said column having a level, the level being within an initial level range during normal operation;

and a steam-space disposed geodetically above said column of water;

a safety device passively operating without externally applied power for improving an inherent safety of said reactor pressure vessel; and at least two fluid lines connected between said safety device and the interior of said pressure vessel, at least one of said fluid lines communicating with said column of water during the normal operation and at least one of said fluid lines communicating with said steam space during the normal operation, said fluid lines having means for automatically transmitting an actuation criterion to said safety device, with at least a drop of the level in said pressure vessel to a value below the initial level range serving as the actuation criterion.

2. The light water reactor according to claim 1, wherein:

said safety device is a switching vessel in the form of a pressure vessel with a fluid space and a gas cushion space, said switching vessel has heat exchanging pipes being submerged in the fluid space and having one end communicating with the steam space and another end communicating with the reactor water column during normal operation or when the initial level range is present;

said switching vessel initiates condensation in said heat-exchanging pipes if a flow of steam occurs from the reactor interior into said heat exchanging pipes, when dropping below the initial level region of the reactor water; and including at least one main fitting initiating a reactor safety measure, and at least one pilot fitting connected to said at least one main fitting for actuating said at least one main fitting, an increase in pressure due to absorbed condensation heat in said switching vessel being used as a derived actuation criterion for passive actuation of said pilot and main fittings.

3. The light water reactor according to claim 2, including control rods to be inserted into said core, said at least one of pilot and main fittings actuated when the derived actuation criterion has been fulfilled, actuating a reactor scram as a safety measure by quickly inserting said control rods in said core.

4. The light water reactor according to claim 2, including a live steam line, and wherein said main fitting is a live steam penetration fitting closing said live steam line as a safety measure.

5. The light water reactor according to claim 2, including a live steam line and control rods to be inserted into said core, said at least one of pilot and main fittings actuated when the derived actuation criterion has been fulfilled, include live steam penetration fittings, said pilot and main fittings actuate a closing of said live steam line as a safety measure and actuate a reactor scram as a safety measure by quickly inserting said control rods in said core.

6. The light water reactor according to claim 2, including a condensation chamber, and blow-off units connected to said at least one of pilot and main fittings being actuated when the derived actuation criterion has been fulfilled, said blow-off units blowing-off steam in said condensation chamber to depressurize said pressure vessel or a primary loop.

7. The light water reactor according to claim 1, including:

a water reservoir containing water;

said pressure vessel having a steam space;

said safety device being an emergency condenser having heat exchanging pipes being disposed in the water of said water reservoir;

an inlet pipe configuration interconnecting said emergency condenser and the steam space during normal operation of said reactor, and a drainage pipe configuration interconnecting said emergency condenser and a lower region of the reactor water column at a point above said reactor core;

water or condensate in said heat exchanging pipes stagnates during normal operation, but reactor steam flows through said inlet pipe configuration into said heat exchanging pipes and condenses there if the level of the reactor water drops to another level below the initial level range, so that condensate flows back into said pressure vessel through said drainage pipe configuration.

8. The light water reactor according to claim 7, including a condensation chamber below said water reservoir for blowing-off excess reactor steam.

9. The light water reactor according to claim 7, wherein said inlet pipe configuration has an inlet and a connection to said heat exchanging pipes and slopes downward from said inlet to said connection, and said drainage pipe configuration has a connection to said heat exchanging pipes and an outlet end and slopes downward from said connection to said outlet end.

10. The light water reactor according to claim 9, wherein said heat exchanging pipes have first and second pipe legs and a reversing bend and are essentially hairpin shaped with respective upward and downward slopes, said first pipe leg being connected to said inlet pipe configuration and said second pipe leg being connected to said drainage pipe configuration.

11. The light water reactor according to claim 7, wherein said drainage pipe configuration has a downwardly running, hairpin shaped pipe bend located on a section in a gap between said pressure vessel and said flooding reservoir, said bend forming a circulation block during normal operation.

* * * * *